United States Patent [19]

Simmons

[11] Patent Number: 5,104,047
[45] Date of Patent: Apr. 14, 1992

[54] WET PROCESS RECOVERY SYSTEM FOR SOLID WASTE

[76] Inventor: Leonard E. Simmons, Buffalo Airport Center Suite 24, 4454 Genesee St., Buffalo, N.Y. 14225

[21] Appl. No.: 570,464

[22] Filed: Aug. 21, 1990

[51] Int. Cl.[5] .............................................. B02C 23/18
[52] U.S. Cl. ................................... 241/20; 209/172.5; 209/173; 241/21; 241/24; 241/62; 241/79.1; 241/81; 241/101.2; 241/190; 241/243; 241/DIG. 38
[58] Field of Search ................. 241/DIG. 38, 190, 73, 241/189 R, 81, 243, 20, 62, 185 A, 24, 46.08, 79.1, 101.2; 209/172.5, 173, 172

[56] References Cited

U.S. PATENT DOCUMENTS

| | | | |
|---|---|---|---|
| 2,635,104 | 4/1953 | Chayen | 241/20 X |
| 2,869,793 | 1/1959 | Montgomery . | |
| 2,986,347 | 5/1961 | Stevenson . | |
| 3,018,972 | 1/1962 | Steinmetz . | |
| 3,162,382 | 12/1964 | Danyluke . | |
| 3,224,839 | 12/1965 | Pierson . | |
| 3,310,241 | 3/1967 | Wandel | 241/81 X |
| 3,363,847 | 1/1968 | Joa . | |
| 3,784,116 | 1/1974 | Buckman et al. | 241/DIG. 38 X |
| 4,458,846 | 7/1984 | Mardigian | 241/20 |
| 4,917,310 | 4/1990 | Carrera | 241/81 X |

Primary Examiner—Mark Rosenbaum
Attorney, Agent, or Firm—Lowe, Price, LeBlanc & Becker

[57] ABSTRACT

Disclosed is a wet process recovery system for solid waste. The waste is fed into a hydrokinetic separation step wherein it is immersed in a body of water which is subjected to rising and lateral flows. These flows establish a synthetic gravitational environment to effect separation of solids above and below a predetermined density greater than the density of water. The solids having the higher densities are collected by gravity and transported from the water for recycling. A modified hammermill is connected to the body of water and the rising and lateral fluid flows cooperate to carry waste into a cutting and ejecting mechanism which both shears friable waste and dynamically ejects non-friable waste back into the liquid. The output of the hammermill is a slurry of comminuted waste in the liquid. This is pumped to a centrifuge separator where solid waste is separated from liquid and the liquid recirculated to the body of water to create the flows in that body. The solid waste output is in a deliquified form suitable for use in a waste to energy incineration process.

24 Claims, 7 Drawing Sheets

WET PROCESS RECOVERY SYSTEM FOR SOLID WASTE

TECHNICAL FIELD

This invention relates generally to the processing of solid waste such as municipal garbage and more particularly to a method and apparatus for converting unsorted solid waste into two categories of resource recovery, namely, recyclable material and a readily usable form of fuel for energy generation.

BACKGROUND ART

The problem of disposing of municipal waste in the United States has grown to epic proportions of imperative immediacy. EPA statistics indicate that 440 tons of solid waste are produced each day. After sorting out the resource recoverable metals and glass, 378 tons or 86% of the total mass is generally buried in what are erroneously referred to as sanitary landfills. However years of unrestrained use of vacant land for this purpose has virtually exhausted the availability of garbage dump sites within economically close proximity to the centers of greatest waste generation, large metropolitan cities. The potential of landfills for contaminating the atmosphere and water supply of such demographic concentrations has now become all too evident.

While recycling and resource recovery are appealing they also have limitations. Newsprint and corrugated material can only be recycled a limited number of times inasmuch as the length of the fiber decreases each time that it is hydro-pulped back into paper stock. When tensile strength decreases, binders are increased, making it less suitable for recycling due to the higher cost of removing the additive binders. Each element except metals and glass has a finite life beyond which it ceases to be suitable for reuse or recycling. Thus recycling does not eliminate waste but only postpones its ultimate disposal. Aluminum remains the chief source of revenue, subsidizing the labor intensive hand sorting required in recycling operations. While recycling constitutes a useful adjunct to waste reduction at its source, recycling does not reduce the remaining 86% of the waste that has limited intrinsic value.

While uncontrolled open incineration would send contaminating noxious gases and particulate matter into the atmosphere the technology now exists to control stack emissions to protect the atmosphere from toxic pollutants. Thus plants for deriving energy from incineration of waste such as in Commerce, Calif., successfully operate with very low impact on air quality. It is believed that plants of this type could become models for future facilities as part of an ultimate solution to the current waste crisis. Fluidized bed technology increases the available oxygen to the fuel in these new generation incinerators, elevating the combustion temperature for more complete burning with minimal stack emissions. Scrubbers and precipitators trap monitored pollutants before they escape.

The high incidence of plastics that pervade today's waste stream possess potentially high heat generation values, almost twice that of bituminous coal used for power generation. Polyethylene, the most popular packaging wrap and food container plastic, will generate 19,950 BTU's per pound under controlled conditions in properly designed incinerators. In comparison bituminous soft coal, which varies according to the acid rain producing sulfur content, generates from 10,000 BTU/lb. to 12,500 BTU/lb. The less costly higher sulfur content coal produces more usable heat but also more acid rain producing sulfur dioxide. A random sample of processed municipal garbage containing a mix of various plastics in addition to the usual organic matter will average 13,850 BTU/lb. using fluidized bed combustion principles.

Most such incinerating (WTE) facilities operating today are at or near capacity due largely to the unpredictable composition of unclassified waste which they receive. Moisture laden organic garbage must be interspersed with dry combustibles to assist in maintaining the minimum 1800° F. necessary for complete combustion. Conceivably a continuous flow of dehydrated, uniform size particles in a heterogeneous mix, could appreciably increase the through-put capacity of such WTE systems, lowering operating costs while maintaining optimum combustion efficiency. Should processing for bulk and moisture reduction be performed at the generation point where recyclables are sorted, hauling costs would decrease. Maximum density loads without the liquid weight could boost truck payload capacity.

Processing to fragmentize and dehydrate solid waste to this desirable state could create an inexhaustible supply of readily usable fuel for energy. Should the processing be accomplished on-site at the point of generation, additional economies could be realized through fewer pick-ups of higher density loads. This form of fuel derived from waste could conceivably create a sought-after commodity rather than be subjected to "tipping" fees since it would not require additional handling or inspection, rendering it the ideal substitute for coal in existing fluidized bed boilers. In addition to these apparent economic incentives, on-site processing as an adjunct to properly designed and operated incinerating (WTE) facilities offer a logical and advantageous approach toward easing the waste management crisis while lessening dependence upon foreign imported oil or domestic fossil sources.

DISCLOSURE OF THE INVENTION

It is a primary object of the present invention to provide a modified wet process and apparatus for converting unsorted solid waste into recyclable material and material in a readily usable form of fuel for energy generation in state of the art WTE systems. In its primary application the apparatus and method of the invention is intended for use at the point of waste generation to prepare, presort and decrease mass prior to transportation to WTE facilities although the invention also may be applied to large scale operations.

It is an object of the invention to provide such a wet process system which accepts without stalling or jamming any unsorted combinations of non-hazardous waste consisting of but not limited to food waste and organic matter, paper, cloth, metal, glass, wood and plastics in continuous or batch feed.

It is another object of the invention to provide such a system which separates metal and glass for recycling before fractionating the remaining waste.

It is another object of the invention to provide such a system which reduces by an average of 80% the remaining bulk to small, uniformly dimensioned (confetti-like) particles.

It is another object of the invention to provide such a wet process system which stabilizes moisture content in the rendered residue at a maximum of about 8%.

It is another object of the invention to provide such a system which converts waste to a readily usable form of fuel, especially suited for fluidized bed boiler waste to energy (WTE) conversion facilities.

It is another object of the invention to provide such a system which will decrease processed waste storage hopper haul-away frequency.

It is another object of the invention to provide such a system which promotes architectural freedom of placement in a building's waste handling system by providing a concealed means of transport between generating areas and a storage bin location.

It is yet another object of the invention to provide such a system which can be programmed for on demand automatic operation thereby reducing janitorial duty personnel requirements.

The above and other objects of the invention are satisfied, at least in part, by providing a classifier and fractionating mill with centrifugal pump and feed hopper to sort out the metal and glass and reduce the remaining waste to a pulpable slurry combined with a high speed liquid/solids centrifugal separator with surge tank and centrifugal pump to dewater the slurry, render the solids and return the transport water to the classifier/mill. The classifier/mill and centrifugal separator co-act with one another while interconnected within a closed loop circuit containing treated process water as the transport medium which also provides cleaning and controlling of bacteria and odor. The classifier fractionating mill consists of an extensively modified hammermill attached to a classifier feed hopper. Hydrokinetic forces developed by the return pump of the co-acting centrifuge provides the necessary fluid velocity and flow used for the flotation/suspension medium for classifying and for producing laminar flow, spray sheet, feed force. As the classified non-recyclable, lower density waste passes through the mill, solids are reduced to a slurry which is then pumped to the centrifugal separator via the closed loop pipe circuit for dewatering. As liquids are extracted from solids, they collect and drain into a surge tank before being pumped back through the return line of the loop to the classifier/mill to continue the processing.

Still other objects and advantages of the present invention will become readily apparent to those skilled in this art from the following detailed description, wherein only the preferred embodiment is shown and described, simply by way of illustration of the best mode contemplates of carrying out the invention. As will be realized, the invention is capable of other and different embodiments and its several details are capable of modifications in various obvious respects, all without departing from the invention. Accordingly, the drawing and description are to be regarded as illustrative in nature and not as restrictive.

BEST MODE FOR CARRYING OUT THE INVENTION

Figure 1:
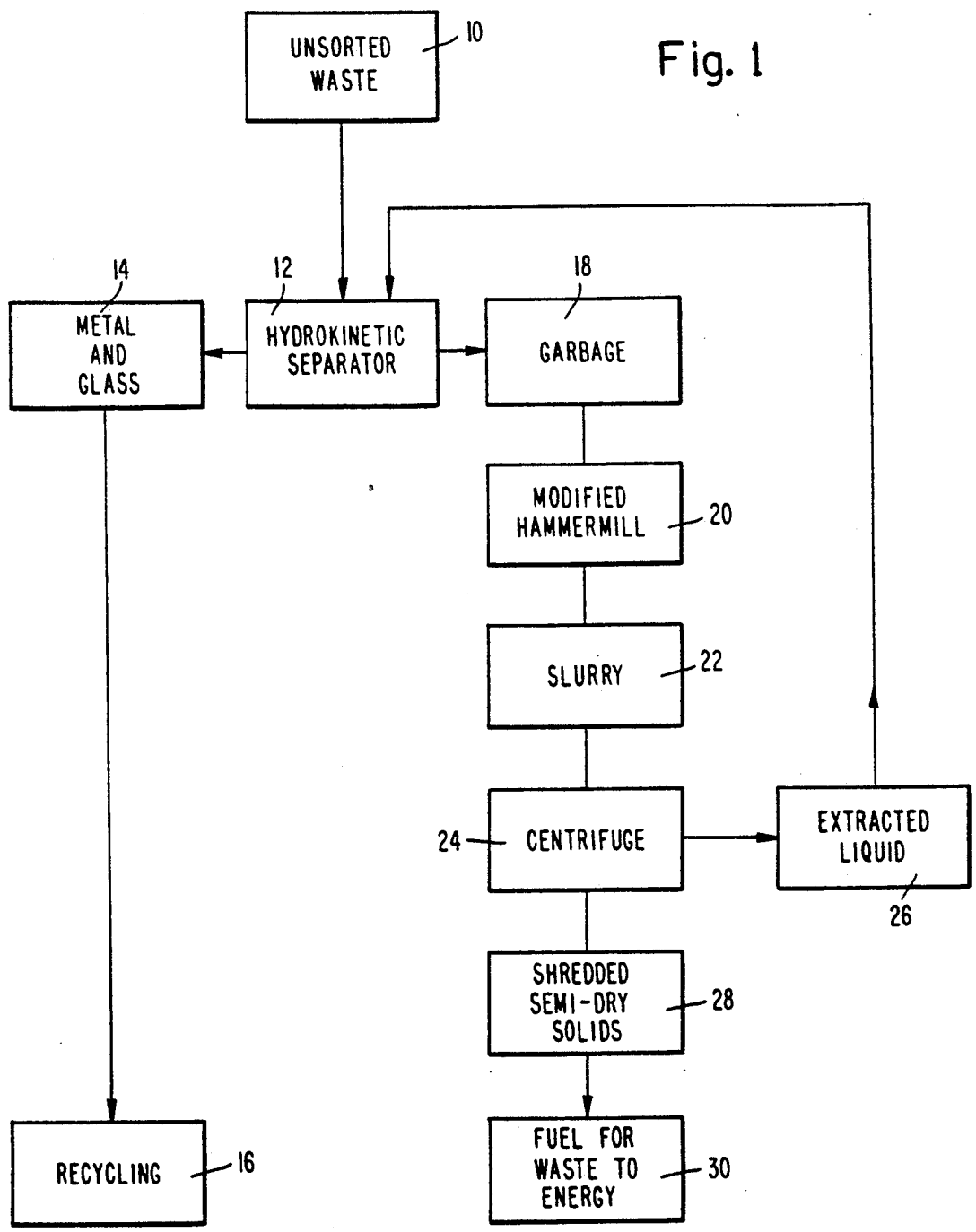
FIG. 1 is a schematic or block diagram of a system for processing waste according to one embodiment of the invention.

Referring to FIG. 1 there is shown a schematic generalized diagram of the operation of the waste processing system of the invention. Unsorted waste such as municipal garbage is received by the system at 10. Such municipal garbage includes both metal and glass generally in the form of non-returnable containers. The unsorted waste is fed to a hydrokinetic separator 12 which separates the metal and glass at 14 for recycling in conventional fashion at 16. Metal and glass are herein treated as irreducible or non-pulpable for purposes of description of this apparatus and methodology.

The hydrokinetic separator produces a second output labeled "Garbage" at 18 although it will be understood that the metal and glass or irreducibles have been removed. The reducibles or pulpable materials are treated in a modified hammermill at 20 to produce a water slurry at 22. This slurry is fed to a centrifuge 24 where liquid is extracted and the extracted liquid 26 recirculated back to the hydrokinetic separator in a generally closed circuit. The other output from the centrifuge comprises shredded semi-dry solids at 28 which are suitable for fuel for waste to energy (WTE) conversion at 30. It will be understood that this diagrammatic depiction is oversimplified and that there are interactions between various steps or stages in the process, particularly the hydrokinetic separator and modified hammermill.

Figure 2:
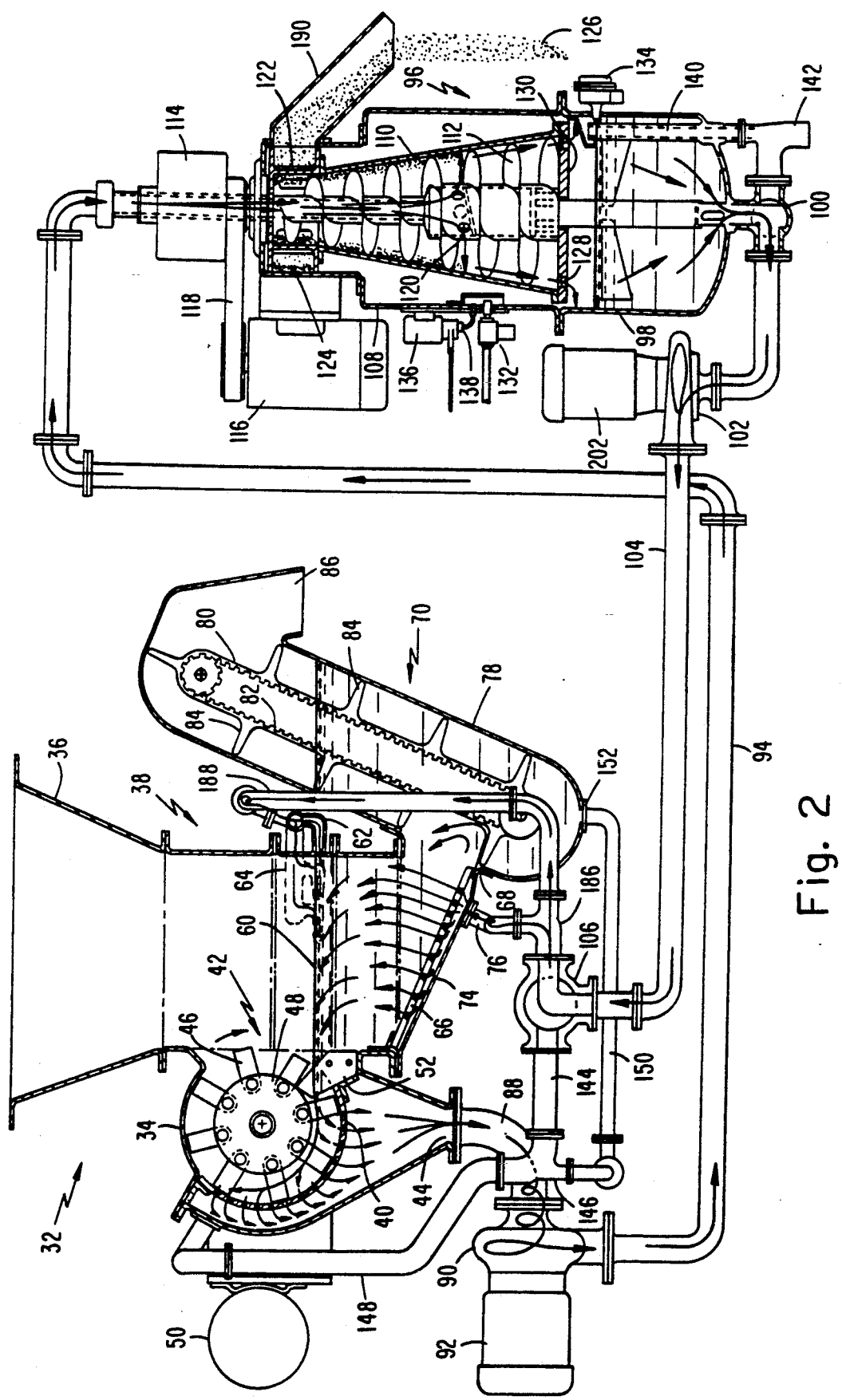
FIG. 2 is a side elevation, partly in diagrammatic section, showing the apparatus of the invention with the mill diverter valve in the process mode and illustrating by arrows the flow through the system in this mode.

Referring to FIG. 2 there is shown at 32 the subcombination comprising a classifier and fractionating mill with centrifugal pump and feed surge hopper to sort out the metal and glass and reduce the remaining waste to a pulpable slurry. This subcombination or classifier fractionator is composed of three assemblies including a fractionating mill 34, receiving hopper 36 and flotation receiver 38. The fractionator mill 34 is a modified hammermill with an enclosing retainer screen 40, horizontal intake port 42, bottom discharge port 44, and individually pivoting hammers 46 mounted on a rotor 48. The rotor is driven by a drive motor 50. The construction of the hammermill is considerably modified in the lower section of the horizontal intake port to provide increased efficiency, prevent jamming and assist the rejection of high density matter or irreducibles. The modified construction in this area is best seen in FIGS. 2, 5, 7 and 8.

Figure 8:
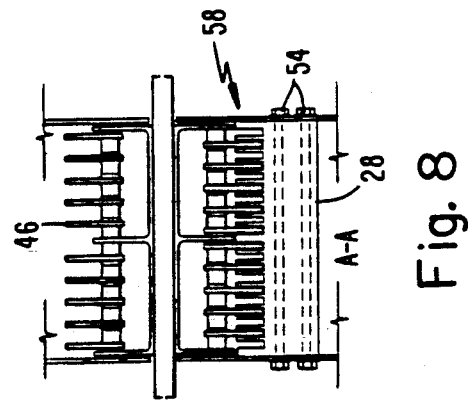
FIG. 8 is a diagrammatic sectional view of the mill wherein the upper portion above the axis of the hammermill shaft constitutes a view looking upwards in the direction of the arrow at the end of the lower radial line A in FIG. 7, and the lower half constitutes a view looking downward in the direction of the arrow at the end of the lower radial line A in FIG. 7 showing the movable hammers and stationary weir teeth or blades.
Figure 7:
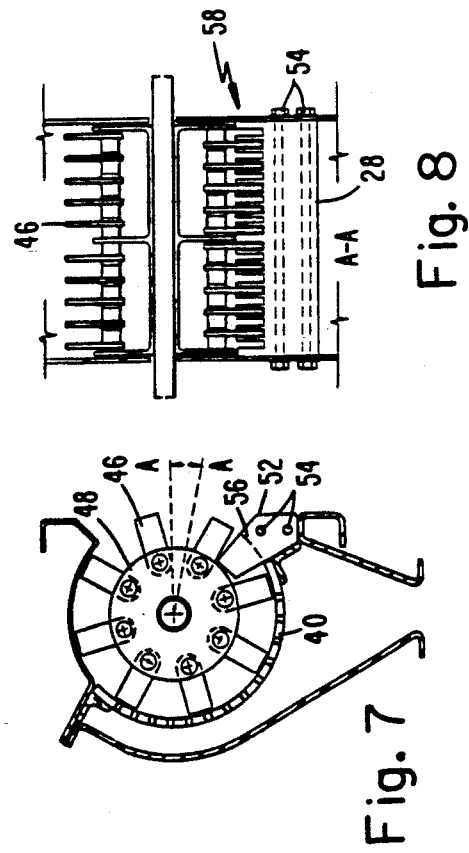
FIG. 7 is a partial vertical section through the modified hammermill showing the movable teeth or hammers and the stationary weir teeth or blades.

Referring to those FIGS. 2, 5, 7 and 8 a horizontally arranged series of inward canted vertical blades or teeth 52 alternately intermesh with the rotating hammer knives 46. The blades or teeth 52 are mounted between spacer plates and may be fastened in any suitable fashion as by bolts 54 (FIGS. 7 and 8). The upper edges of the spacers generally conform to the periphery of the circle defined by the inner surface of the retainer screen 40 as shown at 56 in FIG. 7. The stationary vertical blades 52 and their spacers form a rake-like weir generally indicated at 58 in FIG. 8.

This weir is designed to align the incoming material at right angles to the cutting surfaces of the hammers 46 and stationary blades 52. While the hammer blades 46 have generally parallel edges the stationary blades 52 have converging edges which lie substantially along radials of the axis of rotation of the rotor. The width of the hammer blades is chosen to provide an acute angle of approximately 10°±1° between the cutting edges of radially standing hammer blades and the cutting edge of the stationary blades, as may best be seen in FIG. 7. The purpose and effect of this construction is presently described.

As is also further described hereinafter the weir confines and performs a weir function for flow of the body of water 60 over the weir thereby carrying water borne waste to the cutting areas of the blades. At the same time an inward canted ramp is formed by the stationary blades to aid the recirculation of reducibles during overload and the rejection of irreducibles or non-friables for recycling. This ramp is preferably disposed at an angle of approximately 45° to the surface of the body of water 60. Mill through-put is increased under varying load conditions with the pre-sizing that is accomplished in this first stage. At the same time stalling or jamming under maximum loading is eliminated. Wider varieties of material densities can be handled with lesser drive shaft torque requirements.

Figure 6A:
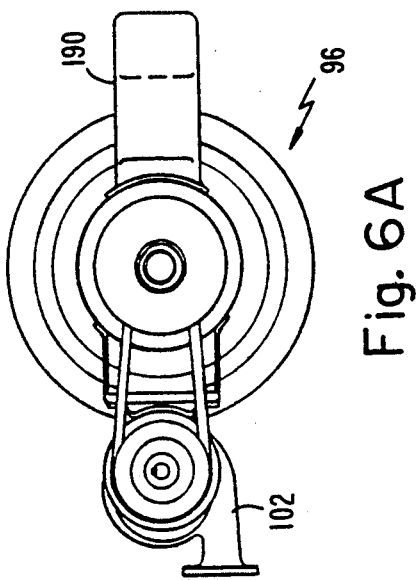
FIG. 6A is a top view of the centrifuge.
Figure 6:
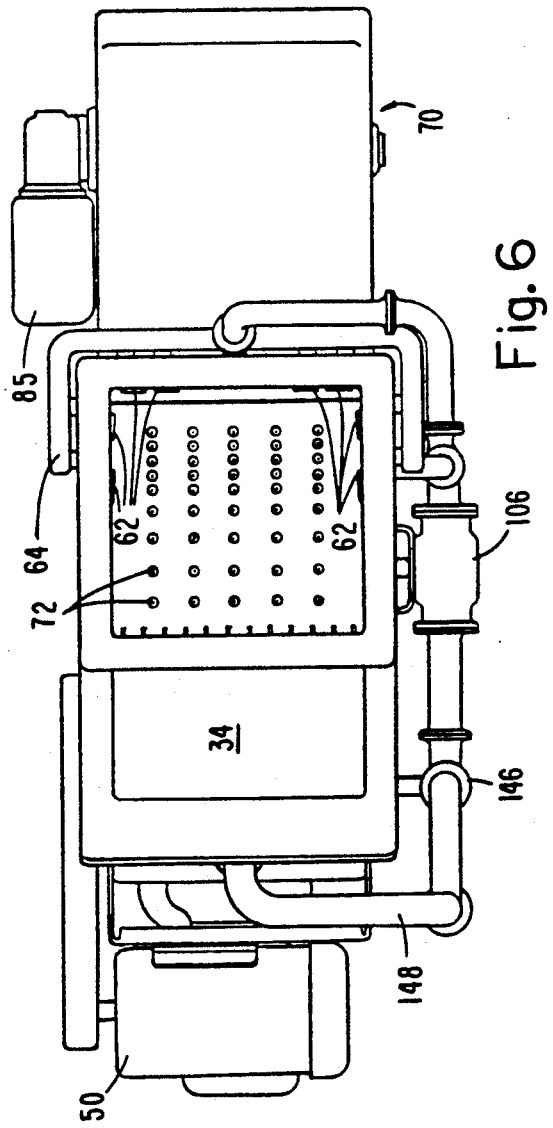
FIG. 6 is a top plan view of the apparatus of FIGS. 2-5 without the piping.

Waste is introduced into the mill through the hopper 36 from which it is fed by gravity into the liquid 60 in the flotation receiver 38. Infeed or input to the mill is controlled in part by a constant velocity water spray sheet pumped across the surface of the water body in the flotation receiver through jets 62 from a manifold 64. (FIGS. 2 and 6). These jets are disposed just beneath the water surface. Referring to FIG. 6 it will be seen that in the specific embodiment illustrated a total of four jets 62 are provided along the wall opposite to the weir and two are disposed at each adjoining side wall. The four jets along the opposite wall are generally directed across the receiver towards the weir and the jets in the side walls are directed into the receiver but preferably canted towards the weir. This provides laminar flow at the surface of the liquid toward the weir at the horizontal input port of the mill.

Referring to FIGS. 2 and 6, the flotation receiver 38 has a floor 66 mounted at an angle or incline descending to the right to an exit port 68. This exit port is connected to the input of an elevator assembly 70 presently to be described. The inclined floor 66 is provided with rows of apertures 72 best seen in FIG. 6. The rows of apertures in the lowermost or right hand portion of the floor are more closely spaced than the rows at the left hand portion of the floor adjacent the horizontal input to the fractionator or mill 34.

Beneath the floor 66 the flotation receiver is provided with an outer casing or bottom 74 spaced from the floor 66 to form a flat passage through which water flows in a manner indicated by the arrows in FIG. 2. Water is introduced into this passage through a fitting 76. The volume of the fluid flow through the floor 66 is greatest at the right hand or lower portion of the flotation receiver by virtue of the increased number of flow apertures in this area. This upward flow coacts with other controlled phenomena to provide unique advantages in the apparatus and method of the invention as is here described.

Since garbage is composed of many kinds of matter each having its own individual relative density, immersion of these substances in water will indicate their particular specific gravity. As is known from Archimedes Principle a body immersed in a fluid is buoyed up by a force equal to the weight of the fluid displaced. If an object immersed in a fluid is heavier than the fluid displaced it will sink to the bottom. If it is lighter it will rise. This principle is utilized according to one feature of the invention to provide the basis for an automated classifier. Based on tests conducted on a Kraus-Jolly specific gravity balance the following identified substances and elements which are normally found in municipal waste indicated the following specific gravities:

| | |
|---|---|
| Polypropylene | 0.91 |
| Polyethylene | 0.93 |
| Polystyrene | 1.05 |
| Acryl/nitryl/butdn/styrn | 1.08 |
| Nylon 6.6 | 1.12 |
| Polymethyl/methacrylate | 1.18 |
| Cellulose/butyrate | 1.18 |
| Epoxy (no filler) | 1.20 |
| Plasticized vinyl | 1.26 |
| Cellulose acetate | 1.34 |
| Rigid vinyl | 1.40 |
| Melamine/formaldehyde | 1.48 |
| Polyester | 1.75 |
| Phenol/formaldehyde | 1.78 |
| Epoxy (mineral filled) | 1.80 |
| Recovery Threshold | |
| Aluminum | 2.56 |
| Silica (uncolored glass) | 3.29 |
| Steel | 7.83 |
| Brass | 8.40 |
| Bronze | 8.78 |
| Copper | 8.95 |

Portions of each of these substances were fractioned to a common dimensioned shape of approximately 8 mm. in diameter. These particles were then dropped into graduated glass laboratory columns filled with water at static. Each substance registered a different rate of descent directly proportional to its specific gravity. In order to decrease the gravitational pull on these submerging particles a positive low velocity flow of water rising from the base of each column was added to decrease the rate of descent. The result was a wider separation of low density matter from high density matter in effect providing a synthetic gravity amplifying the density differential of each element or compound that identifies it from the others. This was discovered to provide a wider separation of low density matter for disposal and high density matter for recycling to provide an adjustable and well defined "recovery threshold".

To expand upon this a series of laboratory glassware open top burettes with bottom stop-cocks and top overflow tubes were arranged on a common rack. Each was connected to a common manifold to supply a low velocity water flow to the bottom stop-cocks. Near the top of each burette the side mounted discharge tubing stubs were connected to another common manifold to collect the overflow run off water and return it back to a variable rate peristaltic pump which supplied the recirculating flow to complete the circuit. Adjusting the bottom stop-cocks and regulating pump speed provided a means of observing this method of hydrokinetic classification of elements.

Varying the velocity changed the point at which the greater density, non-combustible, resource recovery matter descended and remained at the bottom while those of lesser density but still heavier than water remained suspended, gaining buoyancy by restricting the rising flow. Results were documented to indicate the relative differentials by material category, i.e., lesser density disposables for combustion versus greater density recoverables. The substances and elements listed above may be more easily identified from the common objects from which they are obtained, such as bleach bottles, food wrap, plastic utensils, blister pack, child's toy, disposable diapers, upholstery fabrics, appliance parts, "plexiglass", auto tail light lenses, dessert whip buckets, glass jars, aluminum cans, bottle caps, soup cans and sneakers.

Modulation of the flow rising from the base of the burettes provided the optimum point of suspension for those substances normally unable to remain buoyant, i.e., having a specific gravity greater than 1.00, while permitting those of greater density such as metals, alloys and glass to remain submerged. It was found that modulation of the "lift" velocity to control the width or magnitude of the recovery threshold differential can be further amplified through air injection in the stream. For example matter with a specific gravity of 1.92, as in mica filled phenol/formaldehyde resin (automobile brake shoes), separated from aluminum (specific gravity 2.56) with faster definition when exposed to the added buoyancy of an air bubble stream.

It was discovered that the normal specific gravity differential of 0.64 between a high density combustible substance found in solid waste, such as brake shoes, and the least dense of the recoverable metals with the highest monetary value, aluminum cans, increased to the equivalent of a specific gravity differential of 1.30 when subjected to the counterflow induced synthesized gravitational environment as described. Relative to their respective weights, the more dense materials required proportionately greater velocity to create and sustain suspension. When flow was applied in a horizontal direction combined with the vertical ascending flow in a larger vessel the lesser density matter is directed away from the classification area, clearing the pool for additional material for separation. Constant flows are utilized in the vertical and horizontal directions or X and Y planes to achieve this effect.

The fluid impinging on an object creates several forces to cause movement within that fluid mass. The various components of this force can be stated as the undisturbed fluid pressure and velocity that approach the object (stall point), the frictional force tangential to the surface area opposing the motion, the drag component remaining as fluid bypasses the body and the trailing eddies in the resultant wake. Lift can then be defined as a vector of the resultant velocity thrust on the body and the drag coefficient. Quantity and configuration of the bodies and fluid velocity constantly change the wake from laminar to turbulent, the latter producing alternate shedding of vortices which do not appear to significantly affect the process.

Experiments in a one cubic foot translucent vessel with orifices in the floor and nozzles in the side walls as illustrated in FIGS. 2, 3, 4 and 6 and a flow dividing diverter valve balancing vertical and horizontal velocities demonstrated that it was possible to achieve laminar horizontal flow to establish a trajectory for the termination of suspended solids at the mill entrance. Air injection in the suspension flow (as via conduit 76 in FIG. 2), increased the separation differential of the lesser density plastics by an average of 22%.

It will thus be seen that the hydrokinetic separation according to the invention utilizes upward and lateral flows of relative volumes and rates to establish a synthetic gravitational environment in which solids having a specific gravity greater than the specific gravity of the liquid but less than a predetermined higher specific gravity are buoyant in the synthetic gravitational environment whereas solids having a specific gravity higher than the predetermined specific gravity settle. In the example illustrated in the above table the predetermined specific gravity is approximately 2 which permits settling of the metals and glass while the remaining compounds or elements having specific gravities less than the predetermined recovery threshold gravity are directed to the input to the mill for comminution and formation into a liquid solids slurry.

The elevator assembly 70 comprises a casing 78 in which is mounted a deep web designed belt conveyor generally indicated at 80. The conveyor 80 comprises a toothed belt 82 having spaced shelves 84 extending from the surface of the belt to the inner surface of the casing 44. The spacing between the shelves is such that adjacent shelves span the port 68 of the flotation receiver to form a portion of the container for the flotation receiver liquid 60. The belt 82 and its shelves 84 are driven by a motor 85 (FIG. 6) and a suitable indexing mechanism that moves the belt one shelf sector at a time.

Referring to FIG. 2 it will be seen that a space between the floor 66 and casing 74 at the port 68 of the flotation receiver provides for a liquid flow into the cavity formed by adjacent shelves at the port 68. This flow purges the elevator belt cavity with a positive laminar flow to prevent transient low density matter from circulating in low velocity eddy currents. Alternatively to a spacing between the floor 66 and casing 74 suitable ports may be provided at this position. The elevator shelves carry the high density solids which are received thereon upwards and out through a discharge or exit port or chute 86 from which they may be collected in suitable containers for recycling.

Connected to the lower discharge port 44 of the mill 34 via conduit 88 is a conventional recessed impeller vortex pump 90 driven by a motor 92. This pump design provides a tolerance of stringy fibrous material which could otherwise plug a conventional cutwater designed centrifugal pump. The recessed impeller used in this type pump develops toroidal forces within the volute housing, suspending the immersed solids in motion without coming in contact with the impeller vanes, allowing a total cross-section of unobstructed flow from intake to discharge.

The classified non-recyclable lower density waste which passes through the pump 90 is fed as a slurry through slurry line 94 to a centrifugal separator 96 for dewatering. As liquids are extracted from the solids in the centrifuge they collect and drain into an accumulator or surge tank 98. The tank 98 is connected through diverter valve 100 to a centrifugal recirculating pump 102 which returns the liquid through the return line 104 and a diverter valve 106 to the floor of the flotation receiver and to the manifold 64. Thus there are spaced inlets for reintroducing the recirculated water to the receiver 38. The accumulator tank 98 forms the lower portion of an outer centrifuge casing 108.

Figure 3:
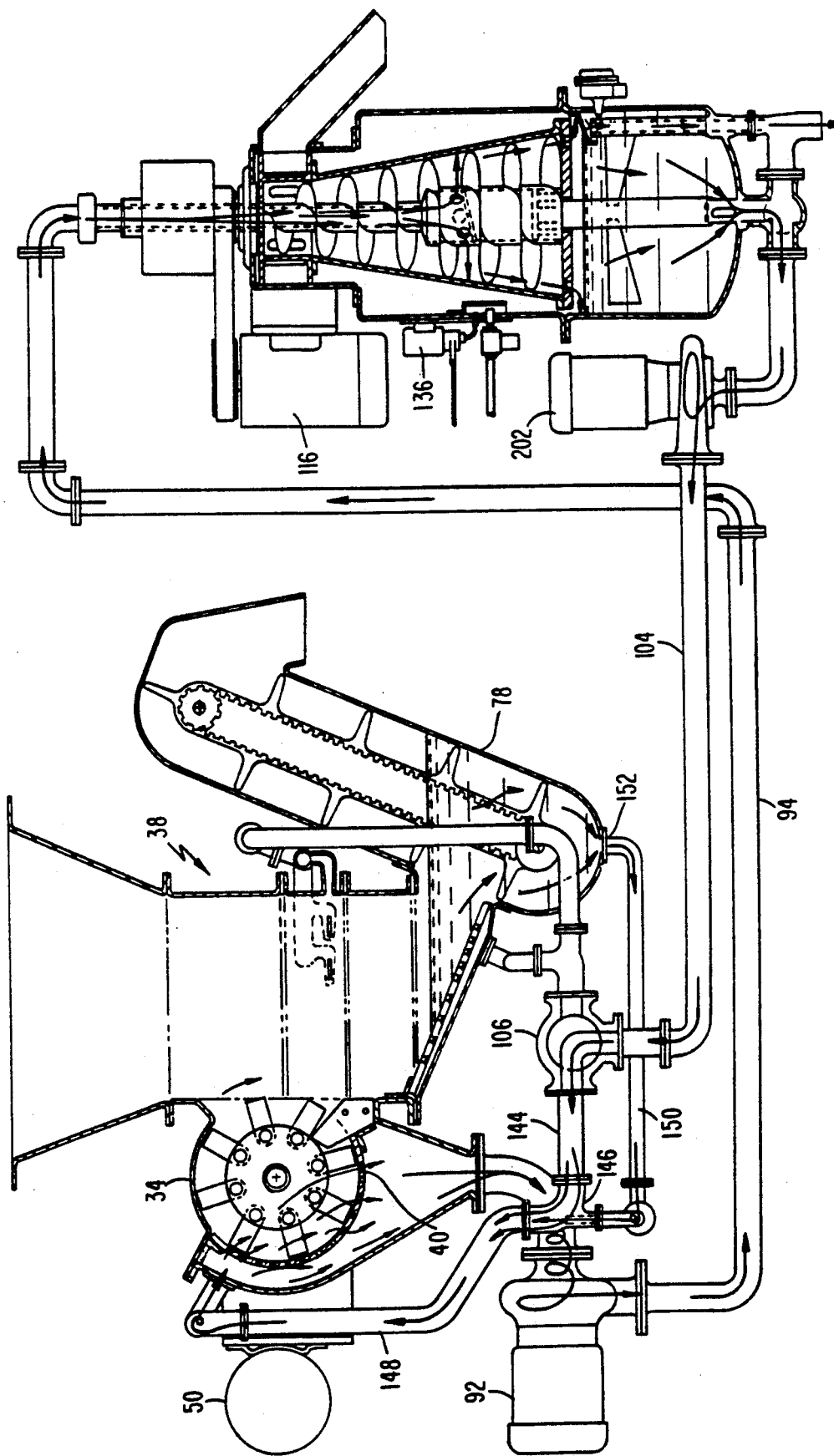
FIG. 3 is a side elevation, partly in diagrammatic section, showing the apparatus with the mill diverter valve in the flush mode and illustrating by arrows the flow through the system in this mode.

Referring to the mill portion of the system in FIGS. 1 and 3 the diverter valve 106 is also connected through conduit 144 and venturi fitting 146 to conduit 148 terminating at the upper portion of the casing of the mill 34. Also connected to the Venturi fitting 146 is a conduit 150 which drains the bottom port 152 in the elevator housing 78. The purpose and functioning of this arrangement is presently described.

Solids are separated from liquids in the centrifuge 96 using a conventional continuous conical bowl and scroll type centrifuge. This type centrifuge consists of a rotating solid cone shaped cylindrical bowl 110 with an inner hollow shaft conveyor scroll 112 rotating at a slightly lesser speed than the bowl. This differential in speed is obtained through an epicyclic planetary gear transmission 114 driven by motor 116 through belt 118.

Feed slurry from the slurry line 94 is introduced internally through ports 120 in the hollow tubed scroll shaft in the center of the rotating assembly, as shown by the flow arrows in FIG. 2. As the slurry accelerates to machine speed, such as 4000 RPM, it evenly distributes on the inside walls of the bowl 110. Solids settle and compact centrifugally against the walls of the bowl as they are conveyed upwardly by the scroll toward the lesser diameter drying section of the bowl. Here drainage is accelerated under the influence of high centrifugal force, such as around 3000 G's, producing a substantially dry cake at a moisture content of approximately 8%. This is then discharged through exit ports 122 in the smaller diameter end of the conical bowl. From here the material is fed to a discharge chute forming exit port 86 via an annular discharge chute transition conduit 124. Accumulation resulting from impaction on walls around the inner periphery of the stationary discharge chute transition is prevented by exit port plows. These resilient scavenging wiper blades are located behind each exit port and gather the discharged solids, pushing in a plow-like manner until the solids are ejected through the outlet and the chute entrance as a stream 126 descending to a collection bin or conveyor. The material at this point constitutes a suitable fuel for WTE incineration.

The accumulator tank 98 collects the water or liquid which flows through the radial discharge ports 120 along the lower and larger end of the conical bowl 110 through exit apertures 128 in the floor 130. Before the system can be placed in a position to process waste, liquid, generally water, at normal line pressure (about 60 PSI) enters the accumulator or surge tank 98 through a valve 132 that is electrically controlled by a level sensor 134. The level sensor also controls an injection or proportioning pump 136 to meter liquid additives through an inlet line 138 for disinfecting and cleaning internal wetted surfaces. By charging the raw water with a 0.15% (150 PPM) dilution ratio of either of two EPA approved commercially available broad spectrum anti-microbial detergents, infectious medical waste is thoroughly immersed and fractionated in a virucidal bath. Due to the extended time this waste is exposed to these tuberculocidal agents, total efficacy of control of HIV-1 (Aids virus), herpes simplex type I, staphylococcus, salmonella and streptococcus is achieved during processing.

An overflow tube 140 in the accumulator tank 98 is connected to a drain pipe 142 which is also connected to the diverter valve 100.

It will be noticed that elbows are included in the piping utilized in the system of the invention. The pumping of slurries in enclosed pipe systems has been found to almost inevitably produce problems of plugging caused by the impingement of solids against the walls of elbows where the direction of the fluidized substance suddenly changes direction. The kinetic forces developed by the mass in motion within the confined space of the pipe resists deflection at the elbow causing the solids within the slurry to deposit and eventually accumulate against its walls to the point of complete blockage of the flow. Back pressure in the line results followed by stoppage of the system flow.

In order to correct this problem if and when it should occur, it is a feature of the invention to provide an automatic purging elbow which senses the build up of solids at the critical area inside the elbow and releases a momentary burst of water at line pressure which is greater than that of the slurry line, dislodging and refluidizing the deposit. An improved automatic purging elbow to accomplish this result is illustrated in FIGS. 9 and 10.

Figure 9:
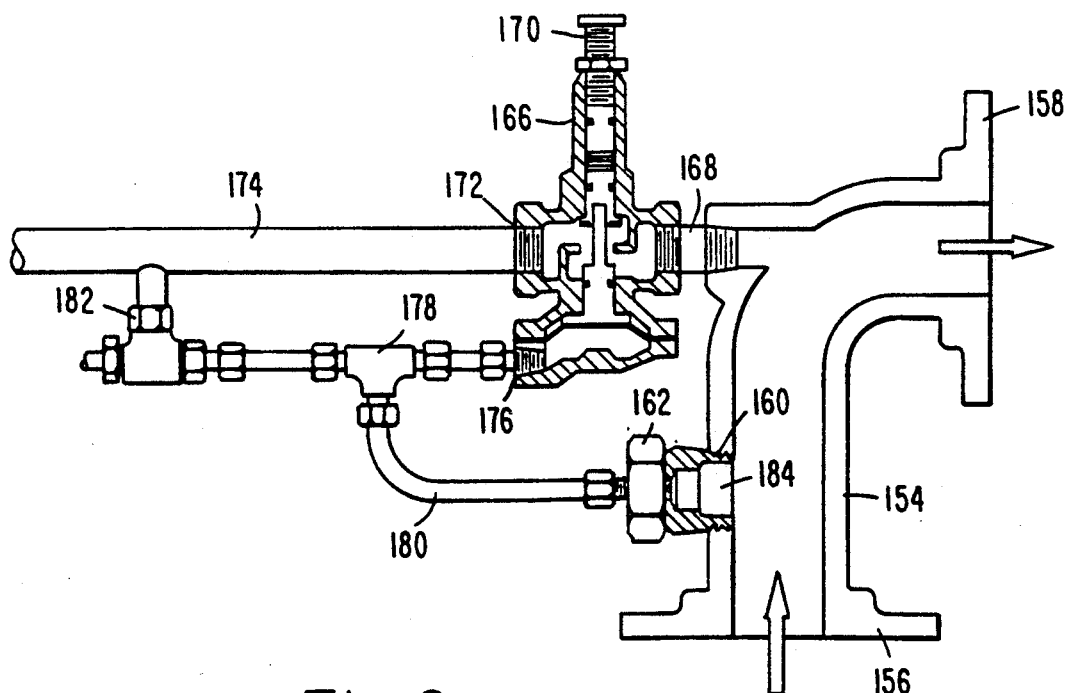
FIG. 9 is a vertical elevation through an automatic purging elbow of the invention for back pressure relieving on plugged slurry lines showing water flow in the purging condition.

Referring to FIG. 9 there is shown an elbow 154 having inlet and outlet flanges 156 and 158. Also provided on the elbow 154 is a threaded filter opening 160 which screw-threadedly receives a filter 162. Also provided is a nipple 164 to which a diaphragm type back pressure valve 166 is connected by a short pipe 168. The back pressure valve 166 is provided with a conventional pressure unloading adjustment screw 170. The other port 172 of the valve 166 is connected to the pressure supply line 174 which is normally at supply pressure of about 60 PSI. The other side of the diaphragm type back pressure valve is connected via nipple 176, T-fitting 178 and conduit 180 to the sensor 162. The other side of the T-fitting 178 is connected through an adjustable needle valve 182 to the water supply line 174. The filter 162 is a permeable plastic air noise muffler plug 184 which may be formed by way of example of Vyon plastic manufactured by Atlas Minerals and Chemicals, Inc. of Pennsylvania.

In operation water line pressure of 60 PSI is admitted to the porous bleed sensing plug 184 through the adjustable orifice needle valve 182 to control the volume of flow to that necessary for operating the diaphragm on the back pressure valve 166 when it meets resistance at the vent plug 184. Instead of discharging into the lower pressure slurry line, this pilot pressure backs up against the diaphragm, causing the valve stem to rise admitting high pressure water to the elbow thereby relieving the plug as shown by the flow arrows in FIG. 9.

Figure 10:
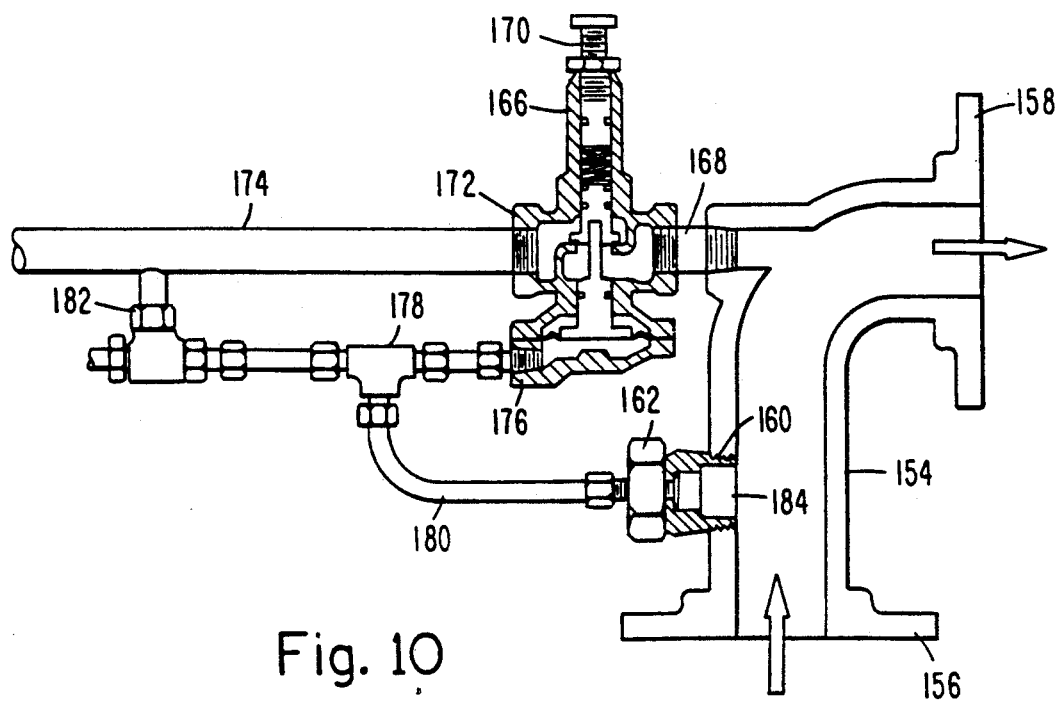
FIG. 10 is a vertical section showing the automatic purging elbow of FIG. 9 in the stand by and free flow condition and illustrating the water flow under such conditions.

As the pressure drops back to normal in the slurry line the diaphragm returns the back pressure valve stem to its closed position, stopping the flow of high pressure water as the pilot pressure is relieved through the porous vent, returning the valve to its stand-by status shown in FIG. 10. Adjustment of the trigger pressure at which relieving is desired is obtained by regulating the back pressure unloading adjustment screw 170 which counteracts the diaphragm pilot pressure. Maintaining a positive water flow, even though a trickle, prevents slurry solids from accumulating in the sensing porous surface. An electronically controlled version of the purging elbow may use an adjustable pressure transducer in place of the venting plug with a signal processor and solenoid operated water valve to replace the diaphragm back pressure and needle valves.

The operation of the wet process recovery system of the invention is now described.

Before the system can be placed in operation to process waste, water at normal line pressure enters the accumulator or surge tank 98 through the valve 132 until the operating level is reached. This is determined by the level sensor switch 134 which controls the valve 132 as previously described. Liquid additives may be proportioned into the water via the proportioning pump 136 as desired.

When the operating water volume is sufficient to actuate the level sensor, the centrifuge motor 116, return centrifugal pump motor 202, mill pump motor 50 and slurry pump motor 92 are energized. The diverter valves 100 and 106 are positioned to the process mode illustrated in FIG. 2. As waste is processed in the mill section and the centrifuge, additional water may be required or excess drained off, as determined by the degree of absorption or retention of liquid the waste may contain in its unprocessed state. When extracted liquid volume rises above the overflow tube 140 in the accumulator or surge tank 98 it drains off until the proper level is restored. Conversely, should the water level fall the level sensor will reenergize the water feed valve 132 and additive water will enter under line pressure to replace the make up loss.

Waste is now fed to the hopper 36 and drops into the water pool 60 in the flotation receiver 38. Water flows in a closed circuit from the accumulator or surge tank 98 through diverter valve 100, pump 102, return line 104, diverter valve 106 and T-coupling 186 into the base of the flotation receiver and into the manifold 64 via feed conduit 188. The water flow from the manifold through the jets 62 provides a constant velocity water spray sheet which converges with the suspension flow through perforated floor 66 in the manner described to create a laminar profile flow terminating at the weir 58 at the mill intake 42 as indicated by the flow arrows in FIG. 1. This provides a resilient feed force as the fluid impinges upon objects that obstruct its entrance across the weir. The remainder of the centrifuge return water which is fed to the base of the flotation receiver exits through the perforated floor 66 to form this vertically rising flow and also exits from the lower right edge in FIG. 2 to scour the cavity formed by the elevator shelves.

The vertically rising water flow created by the flow through the floor 66 creates a suspension medium used for classifying the various substances through their relative specific gravities while in a temporary state of elevation. Transport fluids with a lesser or greater specific gravity than water may be used to alter the separation spectrum. In addition air may be entrained from a rebreathing pump and injected at 76 to increase buoyancy and assist in elevating heavily liquid laden waste in thin walled encapsulation as in dairy type waste. Maintaining the flow from the centrifuge pump 102 to these two inlets of the flotation receiver supplies the fluid volume, the level of which is determined by the weir at the mill entrance. Through modulation of these two velocities, feed rates and degree of separation can be controlled to accommodate such predominating densities as may be peculiar to the waste source being handled. The fluid level determined by the weir is preferably at or below the lowermost peripheral surface of a right cylinder defined by the hammer supports of the hammermill rotor as it rotates.

As will be seen from the specific gravity table provided above a recovery threshold may be established at a specific gravity of approximately 2. At this point all metals and glass will settle while all of the various listed plastic materials will be buoyed upwardly to be carried by the laminar flow into the weir and entrance to the mill. In a typical illustrative example the stationary blades in the weir may be faced with tungsten carbide having a thickness of approximately 0.125 inches. The pivoted hammermill blades may be faced with tungsten carbide having a thickness of approximately 0.25 inches. The weir spacers may be such that there is a clearance of approximately 0.045 inches between the hammer blades and the stationary blades. Thus particles of this size may pass between the hammermill blades and the stationary blades but most particles will be sheared or shredded to a smaller dimension.

In the situation where waste or garbage is dropped into the hopper 36 in plastic bags, the bags drop vertically and encounter the mill blades. Here they are shredded and release the bag contents. These contents are then stratified and circulated in the synthetic gravitational field in the water bath and fed into the mill blades as described. It is a feature of the invention that there is very little hammer blade projection into the receiving chamber and very little hammer involvement with the waste except at the weir. Referring to FIG. 2 it will be seen that the entrance to the hammermill is formed in the vertical wall of the receiver 38. In a typical embodiment the ends of the hammermill blades extend into the receiver beyond this wall no more than approximately one-half inch. Thus the path of the waste removed in the slurry is generally vertically downward into the body of water and thence generally laterally into the hammermill. The path of the recoverable waste removed by the elevator is generally vertically downward into the body of water and thence generally laterally downward into the base of the elevator.

During this flow high density or recyclable objects such as metals and glass fall to the receiver floor and move down the incline to settle in the entrance to the elevator in the chamber or cavity formed by the two adjacent shelves. These form a trap area wherein the recyclable materials collect. The indexed movement of the belt conveyor moves the belt and its shelves one sector at a time to dump the recyclable material from the elevator exit 86 into a suitable container or conveyor. As the recyclable high density materials collect in the cavity formed between the adjacent shelves on the conveyor in the position indicated in FIG. 1 a portion of the water flow into the base of the receiver is diverted into the cavity as indicated by the flow arrows in FIG. 1. This purges the elevator belt cavity with a positive laminar flow thereby preventing transient low density matter from circulating in low velocity eddy currents.

Figure 5:
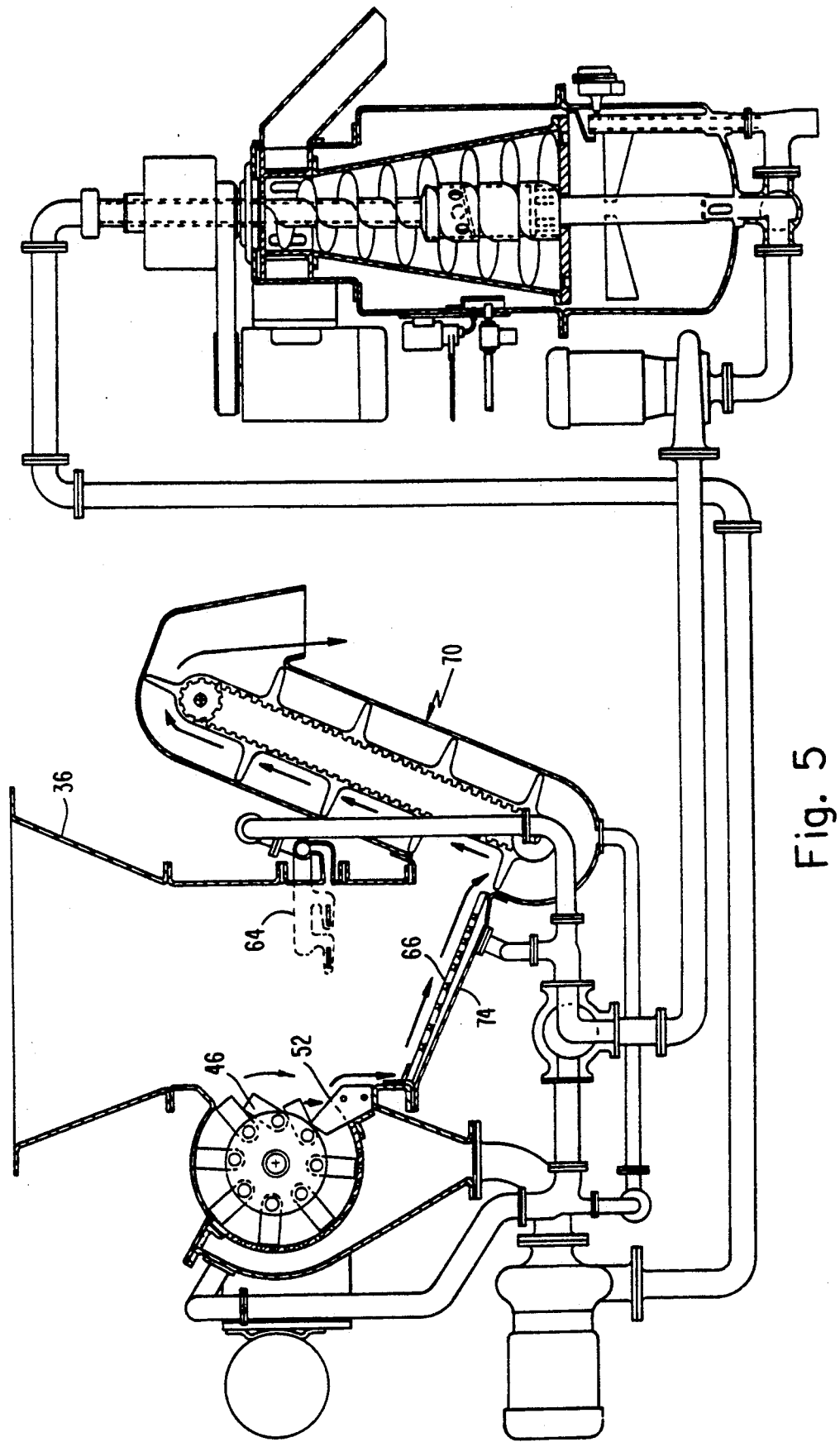
FIG. 5 is a vertical elevation partly in diagrammatic section, showing the apparatus with the mill hammers in a retract position with a high density recovery motion.

Directing attention to the mill action of the fractionator mill 12, as the hammer assembly rotates under no load conditions at normal speed, centrifugal force causes the pivoted hammers to stand out radially and become somewhat rigid. The degree of rigidity is in proportion to the rotational speed of the assembly. As the rows of hammers approach the weir, friable material is wedged between each of the hammer shearing edges and the canted edges of the stationary blades with which they intermesh. A scissor-like shearing develops as the hammers pass through the blades or teeth of the weir. In addition, a displacement pump effect is created simultaneously, flushing the cut solids into and against the retaining screen 40 for the final size reduction. Should the wedged material be less yielding to the hammers or too large in size, the added resistance will cause the hammers to retract slightly as seen in FIG. 5. This increases the shearing action of the hammers by exposing more length at a less acute angle. The downward cam-like force also immediately removes irreducibles from the cutting area against the canted stationary blade surface down into the receiver's descending floor from which they slide into the elevator entrance as shown by the arrows in FIG. 5.

During this pre-sizing phase the shear angle of incidence at the interface of these two cutting surfaces, i.e., the comparative radians of the hammers' edge and that of the stationary blades of the weir, never achieve a parallel null, even under no load conditions. This keeps sound levels at a minimum. Hammer attack angle increases to effect a cross-shearing motion as cutting effort rises, decreasing to a more acute angle under lesser loads resulting in a rapid chopping action to expedite softer bulk.

Should higher density material like metal or glass be encountered at the hammer-weir interface, the hammers retract to their maximum angle, i.e., substantially a right angle relative to the surface of the weir as in FIG. 5. This converts the rotary motion to a linear force, causing the material to be ejected downward away from the fractionator mill intake to the floor below the adjoining receiver. Pending hydrokinetic classification the material is recirculated for another attempt. On the other hand if it is of excessive density it will remain on the receiver floor and descend into the recovery trap or cavity and elevator.

This constantly varying angle is a product of hammer resistance versus rim speed and is proportional to that speed which is a factor of available drive torque or horsepower. Therefore increased drive speed and/or torque will produce a more aggressive attack, reducing higher density material without the recovery feature. Since recycling is not desirable for infectious medical waste or necessary in soft fast food restaurant residue, this high torque version of the same size mill would have increased through-put.

After passing through the weir and into the mill and final reduction against the retainer screen, the developed water-solids mix is then a slurry and flows out the lower discharge port 44 to the recessed impeller vortex pump 90. As previously described this pump design provides a high tolerance of stringy fibrous material which would otherwise plug a conventional cut water design centrifugal pump.

Following the classification which occurs in the receiver and elevator the slurry discharge from the mill port 44 is delivered via the slurry line 94 to the input of the centrifuge 96. The slurry entering the inlet of the centrifuge passes radially out of the discharge ports 120 within the bowl. As the slurry accelerates to machine speed it evenly distributes against walls of the bowl. Solids are compacted centrifugally against the walls as they are conveyed by the scroll upwardly toward the lesser diameter section of the bowl. Here drainage is accelerated under the influence of high centrifugal force and produces a substantially dry or dewatered cake. This cake is then discharged through exit ports 122 in the smaller diameter end of the conical bowl. As the dewatered cake decelerates from the rapidly rotating discharge ports of the bowl accumulation which might result from impaction on walls around the inner periphery from the stationary discharge chute transition is prevented by exit port plows as previously described. The dewatered material then flows through the centrifuge exit passage 190 or chute as a stream 126 of substantially dry particulate material suitable for immediate use as fuel in a WTE incinerator or burner.

Simultaneously, the relatively heavier liquids flow toward the larger diameter end of the bowl through discharge ports 128 and accumulate in the surge or accumulating tank 98 beneath the floor 130. The tank 98 modulates the surges and supplies, maintains and regulates the operating water volume for the slurry and supplies the force medium and feed. Water is removed from the accumulating tank 98 by the centrifugal recirculation pump 102 to continue the recirculation cycle.

Referring to FIG. 3 the main diverter valve 106 is shown in its flush or clean position to place the system in a flush or clean mode. During periods of non-use cleaning may be accomplished by rotating the diverter valve from its process to its flush mode position. In the position shown in FIG. 3 all of the incoming water in recirculation conduit 104 is directed through conduit 148 to the top of the mill chamber behind the retainer sizing screen 40 in the mill 34. When the water is flowed in this direction it flushes the entire extruding area and swing hammer assembly. Concurrently the receiver 38 drains through and with the base of the elevator housing by negative pressure created by the Venturi fitting 146 placed in the flush stream.

Slurry pump and fractionator mill motors 92 and 50 and the motors 116 and 202 associated with the centrifuge continue to run throughout both operating and flush modes until all four motors are stopped when the system is placed in a stand by status.

Figure 4:
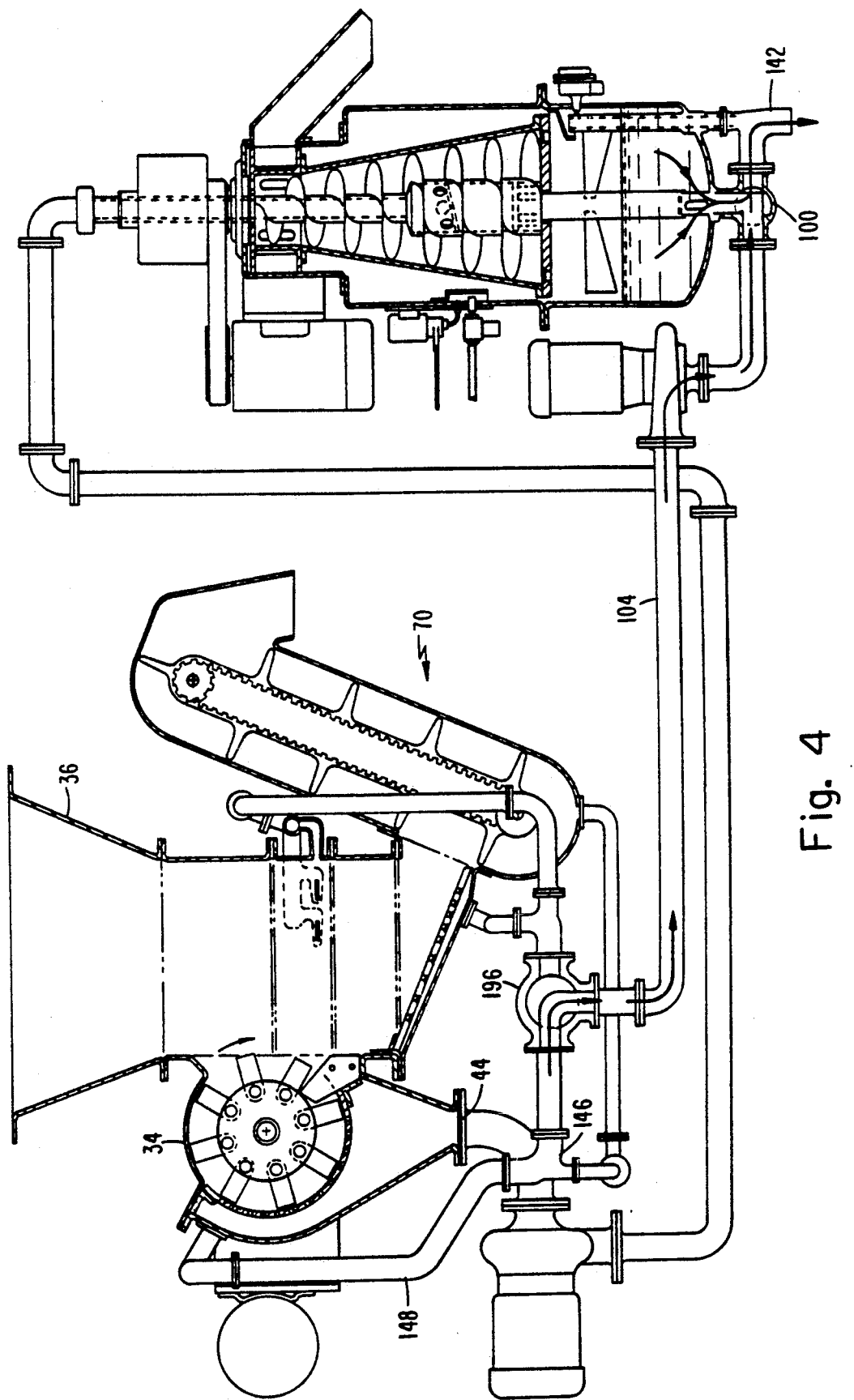
FIG. 4 is a side elevation, partly in diagrammatic section, showing the apparatus with the centrifuge diverter valve in the drain mode and showing by arrows the flow through the system in this mode.

Referring to FIG. 4, in order to shut the system down the main or mill diverter valve 106 is placed in the flush position to clean and drain the receiver and elevator. All motors are stopped and the centrifuge accumulator tank diverter valve 100 is placed in the drain mode. The tank and recirculator pump thereupon discharge into a sanitary sewer drain through drain pipe 142 as shown by the flow arrows in FIG. 4.

It will be apparent that the system may be readily automated so that valve functions, motor controls, start up and shut down procedures are electronically programmed to respond to control buttons that only require the operator to select the process, flush or drain modes. A waste water retention tank may be provided for installations in localities with marginal treatment facilities to capture the drain water to allow a slow feed or seepage into the service sewer thereby decreasing the possibility of shock loading from the high (BOD) effluent. Tank capacity would equal the total displacement of all interconnecting piping as well as the equipment while under operation.

The two composite subcombinations which form the integral system, i.e., the mill, receiver and elevator on the one hand and the centrifuge on the other, may be close-coupled to form an integral unit or remotely separated with pipelines as differences in separation and/or distance may be managed by pumps and valving. Any number of reduction mills may be commonly piped to a single separator, which may be necessary for hospitals, schools and hotels where food service facilities are usually located distant from trash source accumulation. High-rise apartment and office buildings may be provided with a sprinkler protected chute feed into the system. Integral units may be found more convenient for small and fast food restaurants as well as medical clinics. Additional applications may include airline ground service, nursing homes, military mess halls, shipboard and bivouac installations, amusement parts, cruise ships, stadia, prison and security paper destruction installation, lottery, banking and computer timesharing. Municipal refuse trucks may be fitted with on board equipment in place of hydraulic compactors to process as they pick up and assist in autumn leaf disposal thereby raising load density while creating mulch.

Variations in feed hopper configurations are possible to adapt the system installation to the location of the waste production and the nature of the waste. High-rise buildings that rely on multi-floor trash chute feed would require a large surge hopper with electronic controls to start up on demand, continue processing and return to stand-by. Food service preparation and/or scrapping where recycle/retrieval is unnecessary and material is easily pulped, require relatively small mills that can fit beneath a counter. Mass institutional feeding using trays with retrievable dinnerware may utilize a horizontal design of the hydroclassifier where the loaded trays invert within the classifier's suspension flow liquid, allowing the waste to rise and dispose while the tray and dinnerware elevate out of the bath to the dishwashing operation.

In this disclosure there is shown and described only the preferred embodiment of the invention, but, as aforementioned it is to be understood that the invention is capable of use in various other combinations and environments and is capable of changes or modifications within the scope of the inventive concept as expressed herein.

I claim:

1. A waste treatment system comprising:
    waste receiving means;
    hydrokinetic separating means including a body of liquid and means for creating liquid flow in said body for classifying by density the waste received from said waste receiving means into first waste having a density less than a predetermined threshold density established by said flow and second waste having a density higher than said predetermined threshold density;
    hammermill means associated with said body of liquid for receiving therefrom a flow of liquid containing waste, said hammermill means acting on the waste contained in said flow to assist in rejection of said second waste and receive and comminute said first waste, said hammermill means producing at an output port a liquid slurry of comminuted solids waste;
    elevator means associated with said hydrokinetic separating means and communicating with said body of liquid for receiving said second waste and separating said second waste from said body of liquid;
    centrifuge means having an input connected to receive at least a portion of the slurry from said hammermill separating means output port and for separating the liquid from the solids in said slurry, said centrifuge means providing a first output of deliquidized solids and a second output of liquid; and
    means for recirculating liquid from said second output of said centrifuge means to said body of liquid in a manner to create said liquid flow therein.

2. A waste treatment system according to claim 1 wherein said hammermill means includes a waste inlet for receiving said flow of liquid containing waste and a weir means substantially at said inlet determining the minimum level of said body of liquid necessary for flow into said hammermill means, said weir means including upstanding blade means, said hammermill means having a rotor carrying movable hammers disposed to intermesh with and pass between the blade means on said weir means upon rotation of said rotor, whereby said blade means and said movable hammers interact to provide a shearing action on waste flowing into said interacting blade and hammer means.

3. A waste treatment system according to claim 2 wherein said hydrokinetic separating means includes container means containing said body of liquid, and wherein said recirculating means includes conduit means communicating with said container means to flow recirculating liquid into said body of liquid upwardly from substantially the bottom of said body and at substantially the surface of said body of liquid substantially horizontally; and
    wherein at least a portion of said horizontal flow of said recirculating liquid is in substantially the direction of said weir means to create in said body of liquid a synthesized gravitational environment wherein waste having a density higher than the density of said liquid is suspended therein and flowed into said hammermill means and waste having a specific gravity above said recovery threshold settles in said liquid.

4. A waste treatment system according to claim 2 wherein said blade means have cutting edges extending upwardly from the level determining surface of said weir means at an angle to the surface of said liquid in said body of liquid, said angle being such that the angle between said cutting edges and the leading edges of said hammers on said rotating rotor varies between a minimum that of approximately 10° and a maximum no more than substantially 90°.

5. A waste treatment system according to claim 4 wherein the angle assumed by said leading edges of said hammers in operation is a function of the frangibility of solid objects which flow into said weir means into contact with the cutting edges of said blades and the leading edges of said hammers.

6. A waste treatment system according to claim 5 wherein upon the leading edges of said hammers and the cutting edges of said blades coming into contact with solids of said second waste said leading edges and said cutting edges co-act to dynamically apply force to such solids to force movement away from said waste inlet of said hammermill means.

7. A waste treatment system according to claim 1 wherein said hydrokinetic separating means includes container means containing said body of liquid, and wherein said recirculating means includes conduit means communicating with said container means to flow recirculating liquid into said body of liquid upwardly from substantially the bottom of said body and from substantially the surface of said body substantially horizontally thereacross to create in said body of liquid a synthesized gravitational environment wherein waste having a density higher than the density of said liquid is suspended therein and flowed into said hammermill means and waste having a specific gravity above said predetermined threshold density settles in said liquid.

8. A waste treatment system according to claim 7 wherein said container means has floor means defining the bottom of said body of liquid and wherein said floor means slopes downwardly to cause gravity feed of second waste on said floor means to said elevator means.

9. A waste treatment system according to claim 8 wherein said elevator means including housing means extending upwardly from said container means and houses therein a second body of said liquid communicating with said body of liquid and having a surface at the same level as the surface of said body of liquid; said elevator means separating said second waste from said body of liquid by lifting said second waste through the surface of said second body of liquid.

10. A waste treatment system according to claim 1 including conduit means carrying said slurry between said hammermill means output port and said centrifuge means input, said conduit means including at least one elbow means connected to a pressurized liquid supply system and including automatic purging means for relieving back pressure on plugging of said elbow means in said conduit means.

11. A waste treatment system according to claim 10 wherein said elbow means comprises inlet means and outlet means connected by a bent conduit, a permeable means communicating with said conduit on the inlet side, a port communicating with said conduit on the outlet side through a back pressure actuated valve means having a main liquid inlet connected to said pressurized liquid supply and a main outlet connected to said port, said back pressure actuated valve means having a back pressure inlet connected to said permeable means and connected to an adjustable valve having an inlet connected to said pressurized liquid supply.

12. A method of treating waste comprising the steps of:
 subjecting said waste to hydrokinetic classification of waste solids in flowing liquid;
 subjecting said waste solids in said liquid to a variable shearing action to separate waste solids that are sheared by said shearing action from waste solids that are not sheared;
 collecting and transporting unsheared waste solids from said flowing liquid;
 subjecting sheared waste solids to a hammering and reducing action to form a slurry of said sheared, hammered and reduced waste solids in said liquid;
 subjecting said slurry to centrifugal action to separate said slurry into a liquid portion and a solid portion in a deliquified state;
 recirculating the separated liquid portion to said flowing liquid in a manner to create said liquid flow.

13. A method according to claim 12 wherein said hydrokinetic classification includes establishing a first upward flow in said liquid and establishing a second lateral flow wherein the relative volumes and rates of said flows establish a synthetic gravitational environment in which first solids having a specific gravity greater than the specific gravity of said liquid but less than a predetermined higher value are buoyant in said synthetic gravitational environment and second solids having a specific gravity higher than said predetermined specific gravity settle in said synthetic gravitational environment.

14. A method according to claim 13 including flowing said recirculated liquid into said liquid in at least two positions to establish said upward and lateral flows.

15. A method according to claim 13 wherein said flows cooperate to create a circulation of said first solids to said shearing action and permit said second solids to settle and be collected and transported from said flowing liquid.

16. A method according to claim 12 including flowing said flowing liquid over weir means and conducting said shearing action at said weir means.

17. A waste separator apparatus for use in waste treatment comprising:
 liquid container means for holding a body of liquid;
 hopper means for receiving waste and delivering waste to said container means and body of liquid;
 inclined floor means at substantially the bottom of said container means defining a shallow portion of said body of liquid and a deep portion of said body of liquid;
 elevator means communicating with the body of liquid at the deep portion thereof substantially at the bottom thereof and extending upwardly therefrom; and
 hammermill means communicating with said container means at the shallow portion of said body of liquid, said hammermill means having:
 a rotor carrying movable hammers,
 weir means establishing a level for said body of liquid;
 substantially parallel blades extending upward from said weir means and intermeshing with said hammers when said rotor is rotated, said blades having cutting edges extending upwardly from the surface of said body of liquid, said cutting edges being canted to form obtuse angles with the surface of said body of liquid.

18. Waste separator apparatus according to claim 17 wherein said hammers have leading and trailing edges as said rotor is rotated, the cutting edges of said blades being positioned at such an angle with respect to the surface of said liquid to form a relatively small acute angle with the leading edges of said hammers when said rotor is rotated under no load conditions and to form a larger acute angle when rotating under substantial load, the angle varying as a function of the degree of load imposed by said waste.

19. Waste separator apparatus according to claim 17 wherein the surface of said body of liquid is above the level of said weir means and waste is carried by said liquid into said hammermill means through the cutting action exercised by said blades and hammers; said hammermill means having an outlet port means receiving a slurry of said liquid and cut waste; and pumping means connected to said port means for removing said slurry from said hammermill means and delivering same to conduit means.

20. A waste treatment system comprising:
waste receiving means;
hydrokinetic separating means associated with said waste receiving means and including a body of liquid and means for creating liquid flow in said body for classifying by density the waste received from said waste receiving means into first waste having a density greater than the density of said liquid but less than a predetermined threshold density established by said flow and second waste having a density higher than said predetermined threshold density;
hammermill means associated with said body of liquid for receiving therefrom a flow of liquid containing waste, said hammermill means acting on the waste contained in said flow to assist in rejection of said second waste and to receive and comminute said first waste, said hammermill means producing at an output port a liquid slurry of comminuted solids waste;
means associated with said hydrokinetic separating means and communicating with said body of liquid for receiving said second waste and separating said second waste from said body of liquid.

21. A waste treatment system according to claim 20 wherein said liquid flow comprises a first flow rising from substantially the bottom of said body of liquid and a lateral flow substantially at the surface of said liquid cooperating to create a synthetic gravitational environment wherein said first waste is suspended and said second waste settles.

22. A waste treatment system according to claim 21 wherein said hammermill means comprises rotor means carrying movable hammer means and weir means having upstanding blade means intermeshing with said hammer means, said weir means determining the level of the surface of the body of liquid at a position substantially at or below the peripheral surface of a cylinder defined by rotation of said rotor means.

23. A method of treating waste comprising the steps of subjecting said waste to hydrokinetic classification of waste solids and flowing liquid;
said hydrokinetic classification including establishing a first upward flow in said liquid and establishing a second lateral flow wherein the relative volumes and rates of said flows establish a synthetic gravitational environment in which first solids having a specific gravity greater than the specific gravity of said liquid but less than a predetermined higher value are buoyed in said synthetic gravitational environment and second solids having a specific gravity higher than said predetermined specific gravity settle in said synthetic gravitational environment;
flowing said first solids in said liquids through a shearing and comminuting action to produce a liquid slurry of comminuted solids waste; separating said slurry into a liquid portion and a solid portion in a deliquified state;
collecting and transporting said second waste solids from said flowing liquid.

24. A waste treatment system including a waste separator apparatus comprising:
liquid container means for holding a body of liquid;
hopper means for receiving waste and delivering waste to said container means and body of liquid;
inclined floor means at substantially the bottom of said container means defining a shallow portion of said body of liquid and a deep portion of said body of liquid;
elevator means communicating with the body of liquid at the deep portion thereof substantially at the bottom thereof and extending upwardly therefrom; and
hammermill means communicating with said container means at the shallow portion of said body of liquid, said hammermill means having:
a rotor carrying movable hammers,
weir means establishing a level for said body of liquid;
substantially parallel blades extending upward from said weir means and intermeshing with said hammers when said rotor is rotated, said blades having cutting edges extending upwardly from the surface of said body of liquid, said cutting edges being canted to form obtuse angles with the surface of said body of liquid.

* * * * *